United States Patent [19]
Petersen

[11] Patent Number: 4,460,220
[45] Date of Patent: Jul. 17, 1984

[54] ANTI-SKID BRAKE CONTROL SYSTEM FOR A MULTI-AXLE VEHICLE

[75] Inventor: Erwin Petersen, Wunstorf, Fed. Rep. of Germany

[73] Assignee: WABCO Fahrzeugbremsen GmbH, Hanover, Fed. Rep. of Germany

[21] Appl. No.: 372,424

[22] Filed: Apr. 27, 1982

[51] Int. Cl.$^3$ .............................................. B60T 8/02
[52] U.S. Cl. ..................................... 303/119; 303/111
[58] Field of Search ..................... 188/181 A, 181 C; 303/7, 20, 93, 95, 103, 106, 110, 111, 113, 115, 119

[56] References Cited
U.S. PATENT DOCUMENTS

| | | | |
|---|---|---|---|
| 3,574,417 | 4/1971 | Howard et al. | 303/106 |
| 4,071,282 | 1/1978 | Callahan et al. | 188/181 C X |
| 4,093,317 | 6/1978 | Lindemann et al. | 303/111 |
| 4,291,924 | 9/1981 | Leiber et al. | 303/111 |

Primary Examiner—Duane A. Reger
Attorney, Agent, or Firm—J. B. Sotak

[57] ABSTRACT

An anti-skid brake control system for a multi-axle vehicle in which the braking of the wheels of one axle is controlled by the brake pressure of the brake cylinders of the wheels of another axle. The brake cylinders of the second axle are pneumatically connected via at least one pilot throttle valve to the brake cylinders of the first axle. A multi-position control valve is controlled by an electronic evaluating circuit to cause the pilot throttle valve to reduce the brake pressure that is applied to the brake cylinders of the another axle during a regulated braking application and to cause the pilot throttle valve to apply to the brake cylinders of the another axle the full brake pressure that is developed in the brake cylinders of the one axle during an unregulated braking application.

6 Claims, 3 Drawing Figures

ANTI-SKID BRAKE CONTROL SYSTEM FOR A MULTI-AXLE VEHICLE

FIELD OF THE INVENTION

The invention relates to an anti-skid system for a multi-axle vehicle.

BACKGROUND OF THE INVENTION

In viewing FIG. 4 of the West German Preliminary Published Patent Application DE-OS No. 25 45 593, there is shown an anti-skid pneumatic brake control system for road vehicles having two rear axles. The drive shaft is equipped with a sensor which results in the diagonal control of the front and rear wheels. Thus, the sensor therefore measures only the rotation of the driven wheels. The anti-skid system then operates by a corresponding regulation of the brake pressure so that a locking-up of the sensed wheels is prevented. In order to also prevent the locking-up of the sensed wheels, the brake cylinders of these wheels are pneumatically connected and controlled by the brake cylinders of the regulated wheels.

However, such an arrangement has the disadvantage that when there is unequal loading on the axles or wheels, or when there are changes in the braking characteristics, the controlled wheels can still lock-up in spite of the reductions in braking pressure caused by the anti-skid system.

In order to eliminate this disadvantage, there is shown and disclosed in FIG. 4 of U.S. Pat. No. 4,093,317 that the level of the braking pressure of the controlled wheels can be decreased even further by means of an in-line connected restricting or throttle device. However, such a drastic pressure differential can cause undesirable results in the braking performance which could cause excessive brake lining and tire wear. Further, since a greater number of normal brakings occur in the unregulated mode, the brake linings and tires of the controlled wheels are subject to less stress than the other wheels.

OBJECTS OF THE INVENTION

Accordingly, it is an object of this invention to provide a new and improved anti-skid brake control system which results in more uniform brake lining and tire wear.

Another object of this invention is to provide a unique anti-skid system for causing a pressure reduction during unregulated brakings so that brake linings and tires are uniformly worn during the majority of unregulated braking application.

A further object of this invention is to provide an anti-skid brake control system for a vehicle having a front axle and a pair of rear axles with a wheel on each end thereof comprising, a brake cylinder for each wheel of the vehicle, a sensor for providing output signals in accordance with the dynamic behavior of the front wheels and the rear wheels of one of the pair of rear axles, an evaluating circuit for providing control signals in accordance with the output signals of the sensors, a modulating control valve connected to the brake cylinders of the front wheels and the brake cylinders of the rear wheels of one of the pair of rear axles, a throttle valve means connected between the brake cylinders of one of the pair of rear axles and brake cylinders of the other pair of rear axles, and controlling valve means connected to the throttle valve means for causing a reduction in the brake pressure to the brake cylinders of the other pair of rear axles during regulated braking operation and for causing the full brake pressure of the brake cylinders of the one pair of rear axles to be conveyed to the brake cylinders of the other pair of rear axles during unregulated braking operations.

DESCRIPTION OF THE DRAWINGS

The above objects and other attendant features and advantages of the subject invention will be more readily understood from the following detailed description when considered in conjunction with the following drawings, in which.

DETAILED DESCRIPTION OF THE INVENTION

Figure 1:
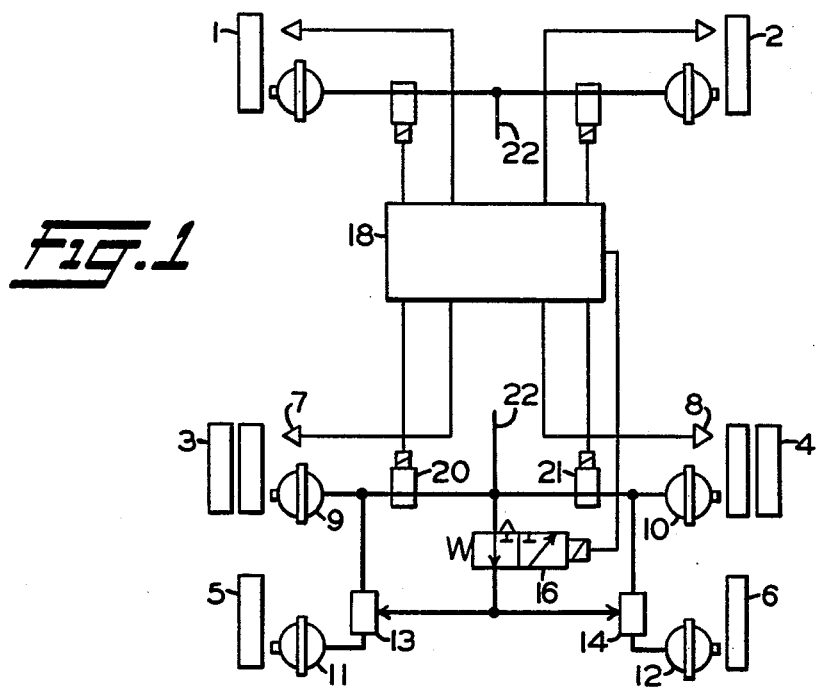
FIG. 1 shows a schematic block diagram of an anti-skid brake control system for a three-axle vehicle with a controllable third axle.

Referring now to the drawing, where like characters represent like parts, and in particular to FIG. 1, there is illustrated an anti-skid brake control system for a three-axle vehicle. The anti-skid system includes an electronic evaluating circuit 18 which processes the signals representative of the dynamic behavior of wheels 1, 2 of the front axle and the first rear axle. As shown, the first rear axle includes a pair of wheels 3, 4 whose speed is sensed by wheel sensors 7, 8 to regulate the pressure of the respective brake cylinders 9, 10.

A source of compressed air, such as, a storage tank (not shown) supplies fluid pressure to the respective brake cylinders via a brake line 22. The brake cylinders 9 and 10 are pressure-modulated during a regulated braking application by means of the respective control valves 20 and 21 which are controlled by the electronic evaluating circuit 18.

A second rear axle simply includes a pair of wheels 5, 6 and respective brake cylinders 11, 12. It will be noted that the rear wheels 5, 6 do not have any sensors but are controlled by the regulated brake pressure of the brake cylinders 9, 10 of the first rear axle. The brake control operation is not initiated directly but is under control of relay or pilot air valves 13, 14 which have two control levels. Instead of bilevel flow relay valves, the pressure reducer valves 13, 14 which provide the load-dependent braking pressure regulation can be load/no-load valves, or controllable throttles.

The controlled operation of the brake cylinders 11, 12 of the second rear axle is accomplished by means of the brake line 22. That is, an electrically operated multi-way valve 16 determines whether or not the pressure line 22 is connected to the pilot valves 13, 14. The solenoid valve 16 is controlled by the electronic evaluation circuit 18 so that during a regulated braking application, the reduction valves 13 and 14 forward the brake pressure which appears at the brake cylinders 9 and 10, respectively, and effects a predetermined reduction in the braking pressure to brake cylinders 11 and 12.

Conversely, during normal or unregulated braking the brake pressure developed in the brake cylinders 9 and 10 is directly conveyed to the brake cylinders 11 and 12, respectively. That is, the controlling valve 16 is shifted to a position in which the supply line 22 is disconnected from the pilot lines of valves 13 and 14 so that brake cylinder 11 and 12 experience no pressure reduction and are operated by the same brake pressure that appears in brake cylinders 9 and 10. Instead of the common control of the reducer valves 13 and 14 by the single two-way valve 16, there can also be a separate control by means of a pair of two-way valves (not shown). Thus, each of the two-way valves can then be activatable according to different criteria by means of the electronic evaluating circuit 18.

Figure 2:
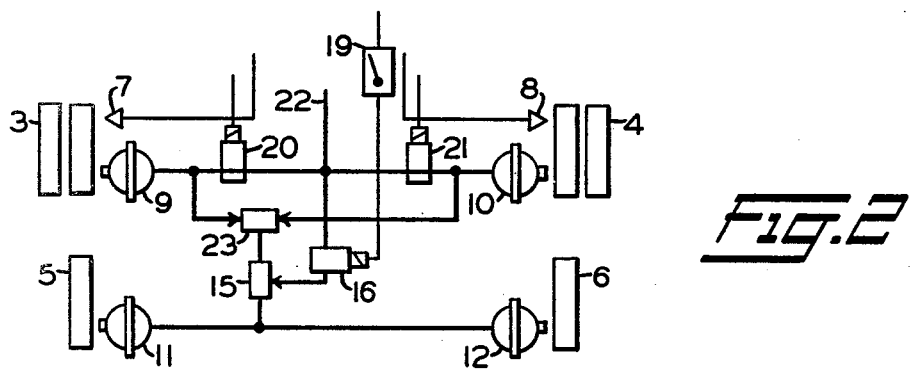
FIG. 2 shows a schematic block diagram with a third axle, which is co-controlled according to the select low principle.

Referring now to FIG. 2, there is shown a slight variation of the anti-skid system in FIG. 1. In this embodiment the second rear axle with the wheels 5 and 6 is controlled in accordance with a select-low principle. Thus, the braking pressures of the regulated brake cylinders 9 and 10 are fed to a reverse double check valve 23. The valve 23 is designed so that the lower of the two braking pressures is effectively passed on. This selected low pressure is fed through a reducer valve 15 which is similar to the valves 13, 14 of FIG. 1, to the two brake cylinders 11, 12 of wheels 5, 6 of the second rear axle. An electrically operated solenoid valve 16 is used to initiate a pressure reducing action by the valve 15 during a regulating brake application. The valve 16 is controlled by the electronic evaluating circuit 18, as described above in regard to FIG. 1.

If desired, a disabling switch 19 can be interposed in the electrical control line of the solenoid valve 16. This switch 19 is used preferably on vehicles whose third axle and rear wheels 5 and 6 are adapted to be raised up off the roadway. In practice, the solenoid valve 16 is permanently switched on when the rear lift axle is raised. This reduces the amount of air consumption used by the brake cylinders 11, 12 of the lifted rear wheels 5 and 6 of the second rear axle.

Figure 3:
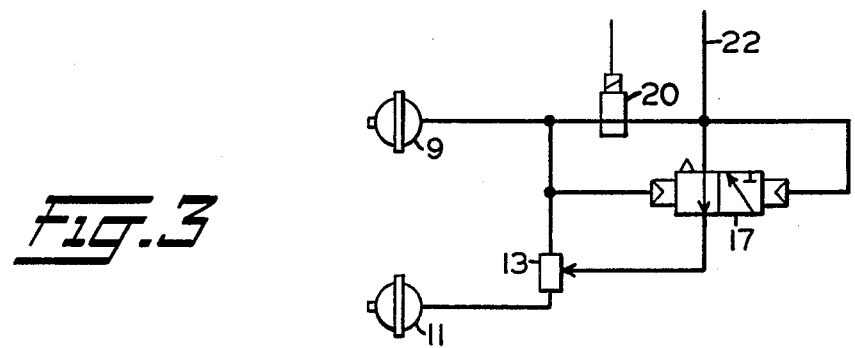
FIG. 3 shows a variation of the embodiment of FIG. 1 with a control of the third axle which can be regulated by means of a pneumatically operated multi-way valve.

Referring now to FIG. 3, there is shown another variation of an anti-skid brake control system covered by the subject invention. For the purpose of convenience, only the left rear half of the vehicle is shown. Instead of an electrically operated valve 16, being controlled by the electronic evaluating circuit 18 as shown and described in FIGS. 1 and 2, a pneumatically controlled multi-way valve 17 is used to control the reducer valve 13. The valve 17 is controlled on the left side by the regulated braking pressure of the brake cylinder 9 or is controlled on the right side by the unregulated braking pressure appearing in line 22. The pneumatic valve 17 is fully closed as long as the two control pressures are approximately of the same magnitude. Under this condition there is an unregulated operational braking action. In this case, the reducer valve 13 is fully opened so that the same pressure is fed to both of the rear brake cylinders 9 and 11. On the other hand, during a regulated braking action, the pneumatic valve 17 assumes a position as shown and causes a reduced pressure to be delivered by the valve 13 to the brake cylinder 11 on the second rear axle. For safety reasons the valve 17, like valve 16, must be designed in such a manner that when it is in state of rest, i.e., quiescence, that the braking pressure is completely shut off to prevent leakage.

Having now described the invention, what I claim as new and desire to secure by Letters Patent, is:

1. An anti-skid brake control system for a vehicle having a front axle and a pair of rear axles with a wheel on each end thereof comprising, a brake cylinder for each wheel of the vehicle, a sensor for providing output signals in accordance with the dynamic behavior of the front wheels and the rear wheels of one of the pair of rear axles, an evaluating circuit for providing control signals in accordance with the output signals of the sensors, a modulating control valve connected to the brake cylinders of the front wheels and of the rear wheels of one of the pair of rear axles, throttle valve means connected between the brake cylinders of one of the pair of rear axles and the brake cylinders of the other pair of rear axles, and controlling valve means connected to the throttle valve means for causing a reduction in the brake pressure to the brake cylinders of the other pair of rear axles during regulated braking operations and for causing the full brake pressure of the brake cylinders of the one pair of rear axles to be conveyed to the brake cylinders of the other pair of rear axles during unregulated braking operations.

2. The anti-skid brake control system as defined in claim 1, wherein said controlling valve means is an electrically operated solenoid multi-way valve.

3. The anti-skid brake control system as defined in claim 1, wherein said controlling valve means is a pneumatically controlled multi-way valve.

4. The anti-skid brake control system as defined in claim 2, wherein said electrically operated solenoid multi-way valve is shifted by a control signal produced by said evaluating circuit.

5. The anti-skid brake control system as defined in claim 2, wherein a switch is interposed between said evaluating circuit and said electrically operated solenoid multi-way valve.

6. The anti-skid brake control system as defined in claim 1, wherein the reduction in the brake pressure to the brake cylinders of the other pair of rear axles is determined by a reverse double check valve which is interposed between the brake cylinders of one of the pair of axles of the said throttle valve means.

* * * * *